(12) United States Patent
Bandi et al.

(10) Patent No.: US 11,676,426 B2
(45) Date of Patent: *Jun. 13, 2023

(54) TOLL ADVERTISEMENT MESSAGE ROAD TOPOLOGIES

(71) Applicant: FORD GLOBAL TECHNOLOGIES, LLC, Dearborn, MI (US)

(72) Inventors: Krishna Bandi, Farmington Hills, MI (US); Sathyanarayana Chary Palakonda, Northville, MI (US); Brennan Hamilton, Birmingham, MI (US); Samer Ibrahim, Dearborn, MI (US); Ivan Vukovic, Birmingham, MI (US); Syed Amaar Ahmad, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 154 days.

This patent is subject to a terminal disclaimer.

(21) Appl. No.: 17/207,008

(22) Filed: Mar. 19, 2021

(65) Prior Publication Data
US 2022/0301356 A1 Sep. 22, 2022

(51) Int. Cl.
*G07B 15/06* (2011.01)
*G07B 15/02* (2011.01)
*G08G 1/01* (2006.01)
*H04W 4/44* (2018.01)

(52) U.S. Cl.
CPC ........... *G07B 15/063* (2013.01); *G07B 15/02* (2013.01); *G08G 1/0116* (2013.01); *H04W 4/44* (2018.02)

(58) Field of Classification Search
CPC ....... G07B 15/063; G07B 15/02; H04W 4/44; G08G 1/0116
See application file for complete search history.

(56) References Cited

U.S. PATENT DOCUMENTS

| | | | | |
|---|---|---|---|---|
| 6,556,916 | B2 * | 4/2003 | Waite | G08G 1/0145 340/933 |
| 7,224,291 | B2 * | 5/2007 | Hassett | G08G 1/017 340/928 |
| 9,691,188 | B2 | 6/2017 | Breed et al. | |
| 2006/0200379 | A1 | 9/2006 | Biet | |
| 2009/0295599 | A1 * | 12/2009 | Coffee | G07B 15/063 340/928 |

(Continued)

FOREIGN PATENT DOCUMENTS

| | | |
|---|---|---|
| EP | 2128825 A2 | 12/2009 |
| WO | 9118354 | 11/1991 |

*Primary Examiner* — Sisay Yacob
(74) *Attorney, Agent, or Firm* — Joseph M. Zane; Brooks Kushman P.C.

(57) ABSTRACT

Smart tolling for vehicles is provided. A toll advertisement message (TAM) is received by a vehicle, broadcast from a road-side unit (RSU) via V2X communication, the TAM defining a plurality of toll road tariff data elements, each of the toll road tariff data elements specifying a set of tolling factors indexed by a unique toll context identifier. Roadway usage of the vehicle is determined. A charge for the roadway usage is determined according to the set of tolling factors of the TAM. A toll usage message (TUM) is sent via the V2X communication, the TUM indicating, to the RSU, the tariff for the roadway usage of the vehicle.

20 Claims, 12 Drawing Sheets

(56) References Cited

U.S. PATENT DOCUMENTS

| | | | |
|---|---|---|---|
| 2014/0257686 A1* | 9/2014 | Feldman | B60W 30/12 |
| | | | 701/300 |
| 2016/0171787 A1* | 6/2016 | Yohalashet | G07B 15/063 |
| | | | 705/13 |
| 2018/0158254 A1* | 6/2018 | Fustes | H04W 4/02 |
| 2018/0357837 A1* | 12/2018 | Ieuji | G08G 1/015 |
| 2019/0164357 A1* | 5/2019 | John | G01C 21/3658 |
| 2021/0056853 A1* | 2/2021 | Caldwell | G05D 1/0219 |
| 2021/0180979 A1* | 6/2021 | Kitahara | G08G 1/0129 |
| 2021/0199463 A1* | 7/2021 | Kitahara | B60W 60/001 |
| 2021/0334552 A1* | 10/2021 | Li | G06V 20/588 |

\* cited by examiner

TOLL ADVERTISEMENT MESSAGE ROAD TOPOLOGIES

TECHNICAL FIELD

Aspects of the present disclosure generally relate to conveying toll advertisement messages for various road topologies over cellular vehicle-to-everything (V2X) communication.

BACKGROUND

V2X Tolling may refer to electronic fee collection (EFC) toll charging supported by electronic equipment on-board of a vehicle configured for V2X communication. These V2X communications may include the exchange of information between various infrastructure elements.

SUMMARY

In one or more illustrative examples, a vehicle for smart tolling. The vehicle includes a telematics control unit configured to provide vehicle-to-everything (V2X) communication and a processor. The processor is programmed to receive a toll advertisement message (TAM), broadcast from a road-side unit (RSU) via the V2X communication, the TAM defining a plurality of toll road tariff data elements, each of the toll road tariff data elements specifying a set of tolling factors indexed by a unique toll context identifier, determine roadway usage of the vehicle with respect to roadway geometry, determine a tariff for the roadway usage according to the set of tolling factors of the TAM, and send a toll usage message (TUM) via the V2X communication, the TUM indicating, to the RSU, the tariff for the roadway usage of the vehicle.

In one or more illustrative examples, a method for smart tolling is provided. A toll advertisement message (TAM) is received by a vehicle, broadcast from a road-side unit (RSU) via V2X communication, the TAM defining a plurality of toll road tariff data elements, each of the toll road tariff data elements specifying a set of tolling factors indexed by a unique toll context identifier. Roadway usage of the vehicle is determined. A tariff for the roadway usage is determined according to the set of tolling factors of the TAM. A toll usage message (TUM) is sent via the V2X communication, the TUM indicating, to the RSU, the tariff for the roadway usage of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Aspects of the disclosure relate to the leveraging of vehicle V2X technology for use with various tolling road geometries topologies. As explained in detail herein, toll advertisement messages may be used to representation complex toll road geometries and topologies, as well as complex toll lane topologies. These geometries and topologies may accordingly be conveyed via the toll advertisement messages utilizing the V2X communications for the vehicles. In addition, the toll advertisement messages may also include triggers for toll usage messages to be broadcast by the vehicles, as well as toll enforcement trigger points. This approach may be used to represent and denote various tolling schemes based on the specific unique combinations of vehicle type, time class, distance class, and/or entry-exit toll point pair.

Figure 1:
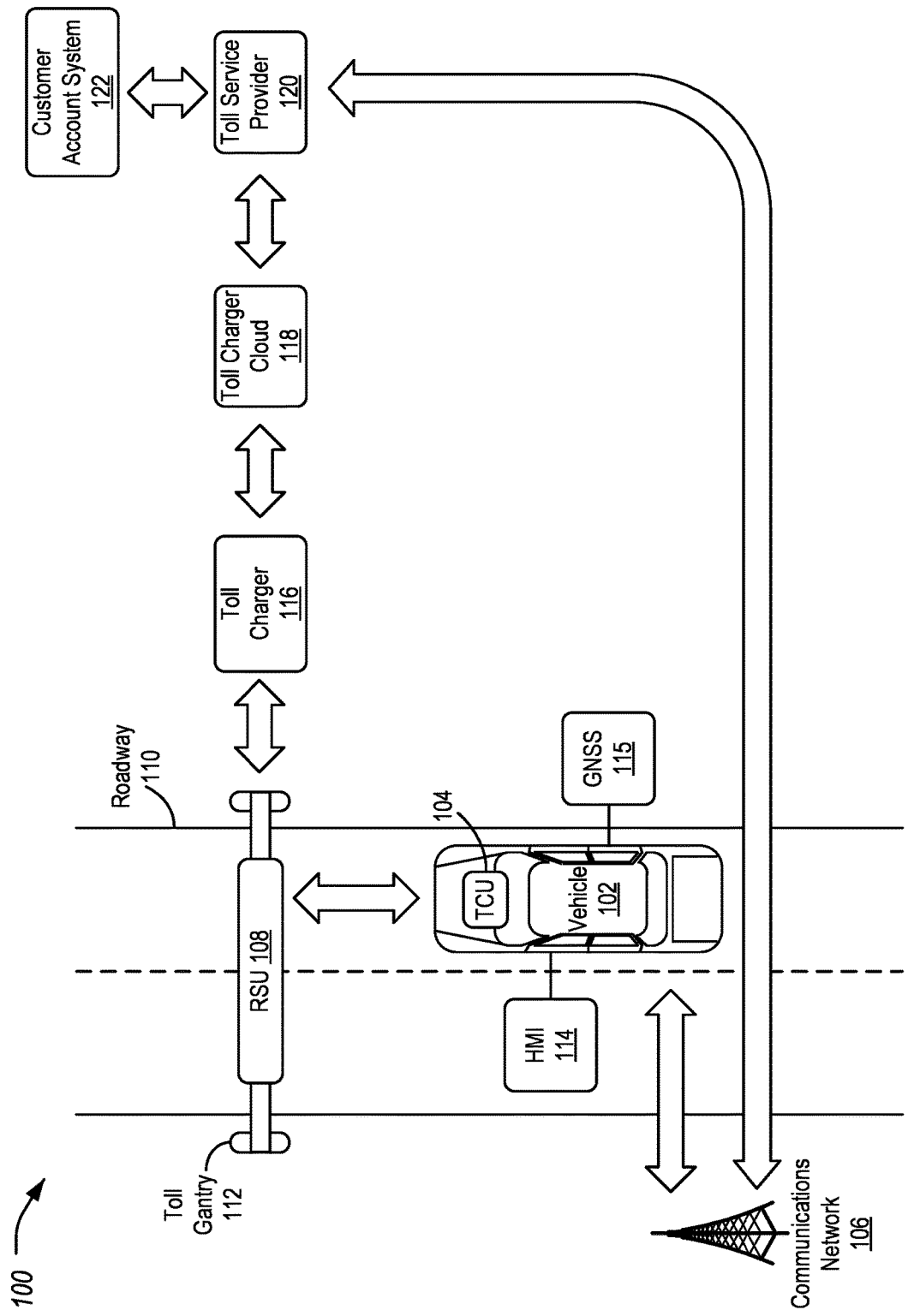
FIG. 1 illustrates an example system for the performance of V2X tolling transactions.

FIG. 1 illustrates an example system 100 for the performance of V2X tolling transactions. As shown, the system 100 includes a wireless-enabled vehicle 102 configured to travel along a roadway 110. The vehicle 102 includes a telematics control unit (TCU) 104 and a human machine interface (HMI) 114. The system 100 also includes a toll gantry 112 or other toll installation that includes a road-side unit (RSU) 108. The RSU 108 communicates with a toll charger server 116 over a secure channel (such as a wired connection), which in turn communicates with a toll charger cloud 118. The toll charger cloud 118 also communicates with a toll service provider 120 and a customer account system 122. Using the TCU 104, the vehicle 102 communicates with the RSU 108 over a broadcast peer-to-peer protocol (such as PC5), and with a communications network 106 over a network protocol, which allows the vehicle 102 to communicate with the customer account system 122, for example. It should be noted that the system 100 shown in FIG. 1 is merely an example, and systems having more, fewer, and different arrangements of elements may be used.

For instance, one or more of the RSU 108, toll charger server 116, toll charger cloud 118, and toll service provider 120 may be combined into a single device. Moreover, while one vehicle 102 along one roadway 110 is shown, it is contemplated that systems 100 would include many vehicles 102 and roadways 110 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The TCU 104 may be configured to provide telematics services to the vehicle 102. These services may include, as some non-limiting possibilities, navigation, turn-by-turn directions, vehicle health reports, local business search, accident reporting, and hands-free calling. The TCU 104 may accordingly be configured to communicate over various protocols, such as with a communications network 106 over a network protocol (such as Uu). The TCU 104 may, additionally, be configured to communicate over a broadcast peer-to-peer protocol (such as PC5), to facilitate V2X communications with devices such as the RSU 108. It should be noted that these protocols are merely examples, and different peer-to-peer and/or cellular technologies may be used.

The communications network 106 may provide communications services, such as packet-switched network services (e.g., Internet access, voice over Internet Protocol (VoIP) communication services), to devices connected to the communications network 106. An example of a communications network 106 is a cellular telephone network. For instance, the TCU 104 may access the cellular network via connection to one or more cellular towers. To facilitate the communications over the communications network 106, the TCU 104 may be associated with unique device identifiers (e.g., mobile device numbers (MDNs), Internet protocol (IP) addresses, etc.) to identify the communications of the TCU 104 on the communications network 106 as being associated with the vehicle 102.

The RSU 108 may be a device with processing capabilities and networking capabilities, and may be designed to be placed in proximity of a roadway 110 for use in communicating with vehicles 102. In an example, the RSU 108 may include hardware configured to communicate over the broadcast peer-to-peer protocol (such as PC5), to facilitate V2X communications with the vehicles 102. The RSU 108 may also have wired or wireless backhaul capability to allow for communication with other elements of the communications network 106, such as the toll charger server 116.

The toll gantry 112 may be framework installed across the roadway 110. The toll gantry 112 may serve as a location to mount hardware to give the hardware a clear view of the roadway 110. In an example, the RSU 108 may be mounted to the toll gantry 112. It should be noted that, in other examples, the RSU 108 may be located along the ground adjacent to the roadway 110 and the toll gantry 112 may be omitted.

The HMI 114 may include various output devices configured to provide information to users, as well as input devices configured to receive information from users. Output devices may include, as some examples, display screens, touch screens, projectors, lights, speakers, buzzers, and haptic feedback sensors. Input devices may include, as some examples, touch screens, keyboards, buttons, knobs, and microphones, as some possibilities.

A global navigation satellite system (GNSS) 115 controller may be utilized by the vehicle 102 to provide autonomous geo-spatial positioning for the vehicle 102. As some examples, the GNSS 115 controller may allow the vehicle 102 to determine its position using one or more satellite navigation systems, such as global positioning system (GPS), GLONASS, Galileo, Beidou and/or others.

The toll charger server 116 is a networked computing device configured to perform operations in support of the functionality of the RSU 108. In an example, the toll charger server 116 may be in communication with the RSU 108 and may be programmed to operate as a gateway between the RSU 108 and the toll charger cloud 118. The toll charger server 116 may be responsible for managing operations between the broadcast nature of the RSU 108 operations and the remainder of the system 100. These operations may include, for example, verification of messages received from vehicles 102 by the RSU 108, certificate verification and identification, and communication with the toll charger cloud 118 to perform further operations over a secure line. In many examples, each RSU 108 may be supported by its own corresponding toll charger server 116. However, in other examples, a single toll charger server 116 may be configured to handle multiple RSUs 108, such as a set of RSUs 108 covering operation of the roadway 110.

The toll charger cloud 118 is a networked computing device also configured to perform operations in support of the functionality of the system 100. In an example, the toll charger cloud 118 may be programmed to perform operations in support of the payment aspects for use of the roadway 110 by the vehicle 102. In some examples, the system 100 may include different toll pay centers 118, where each toll charger cloud 118 is configured to handle payments for those vehicles 102 having accounts with the toll charger cloud 118. As one possibility, different vehicle 102 manufacturers may each maintain their own toll charger cloud 118. As another possibility, vehicles 102 may subscribe to the use of various third-party toll pay centers 118.

The toll service provider 120 is a networked computing device also configured to perform operations in support of the functionality of the system 100. The toll service provider 120 may be configured to perform operations such as providing cost information to the various toll pay centers 118 with respect to the costs for usage of the roadway 110. For instance, the toll service provider 120 may provide a toll schedule indicative of the costs of traversing the roadway 110, including costs for usage of different lanes (e.g., express, carpool, regular, etc.), usage for different classes of vehicles 102 (e.g., passenger cars, semi-trucks, etc.), usage for different times of day, and usage for high traffic vs low traffic situations. The toll service provider 120 may also be configured to perform payment reconciliation operations, reporting functions, and may also provide information regarding vehicles 102 that are observed on the roadway 110 that may not have paid (e.g., as identified according to wireless transmissions of basic safety messages (BSMs), pictures from cameras, etc.).

The customer account system 122 is a networked computing device also configured to perform operations in support of the functionality of the system 100. Using the customer account system 122 a user may set up a payment account, be charged by the toll charger server 116 for use of the roadway 110, and request and receive toll receipts with respect to usage of the roadway 110. Such payment transactions require the exchange of personally identifiable information (PII) with toll authorities over the air.

Figure 2:
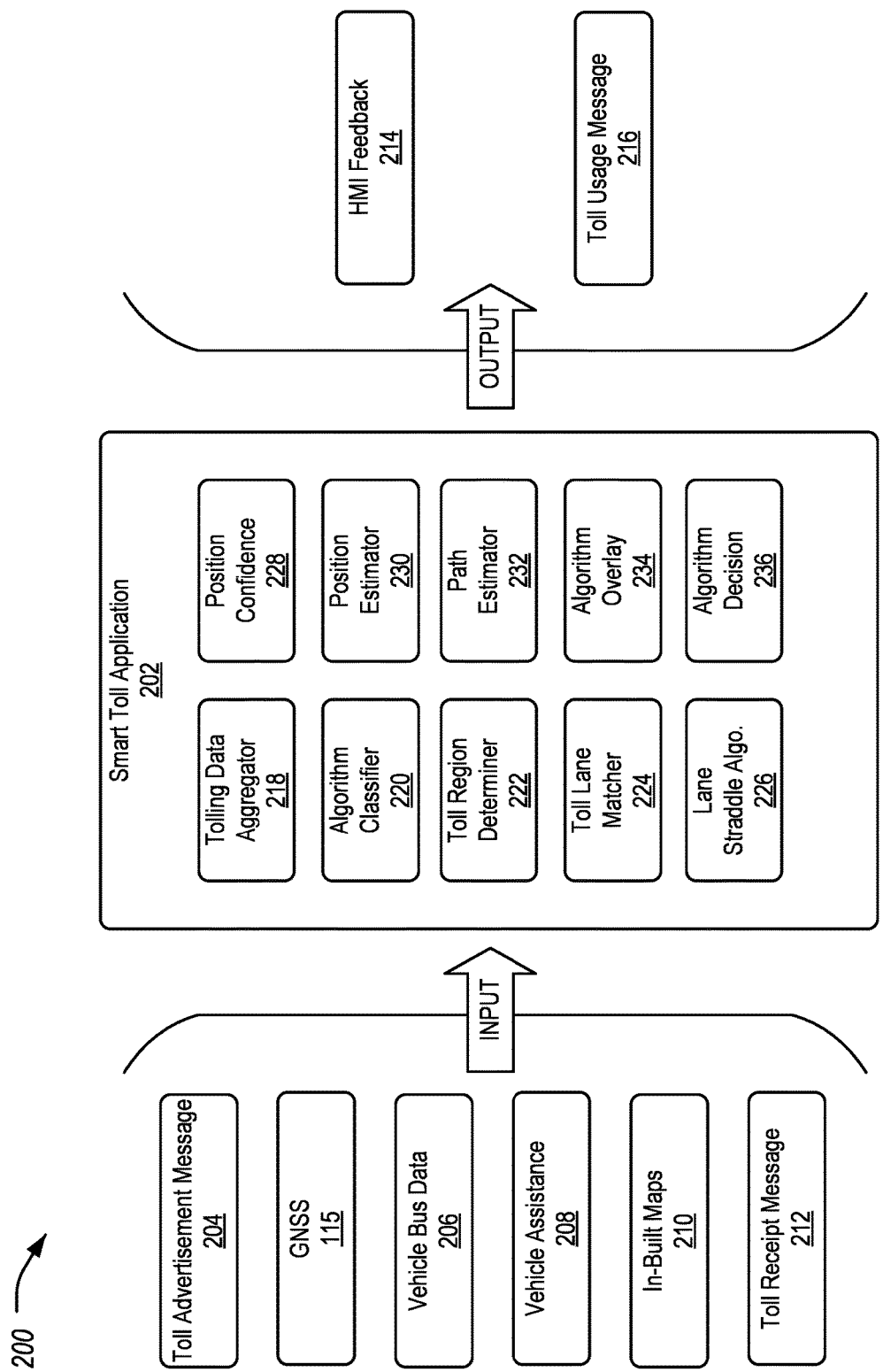
FIG. 2 illustrates aspects of a smart toll application that is executed by the vehicle.

FIG. 2 illustrates aspects of a smart toll application (STA) 202 that is executed by the vehicle 102. With reference to FIG. 2, and with continuing reference to FIG. 1, the smart toll application 202 may be programmed to allow the vehicle 102 to perform various smart tolling operations discussed in detail herein. In an example, the smart toll application 202 may be executed by one or more processors of the TCU 104.

Tolling operations may be performed using the elements of the system 100. For instance, the toll service provider 120 may send a toll rate schedule to the toll charger server 116. This toll rate table may include information that may be used to allow a vehicle 102 to understand the charges that may be incurred to traverse the roadway 110. In a simple example, the toll rate schedule may indicate that the cost to traverse the roadway 110 is a fixed amount. However, in many examples, the cost to traverse the roadway 110 may vary according to various factors. For instance, travel in a first lane may incur a first charge, while travel in another lane may incur a second, different, charge. In another example, the cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of week, and/or weather.

The toll charger server 116 may update rate details of the TAM 204. In an example, the toll charger server 116 receives the toll rate schedule, identifies current rates, and updates rate information at the toll charger server 116. This rate information may be cached at the toll charger server 116 and sent to the RSU 108. The RSU 108 may broadcast the rate information as well as other information in a TAM 204 message. This broadcast may be a periodic broadcast, such as a rebroadcast of the TAM 204 every 100 milliseconds.

Figure 3:
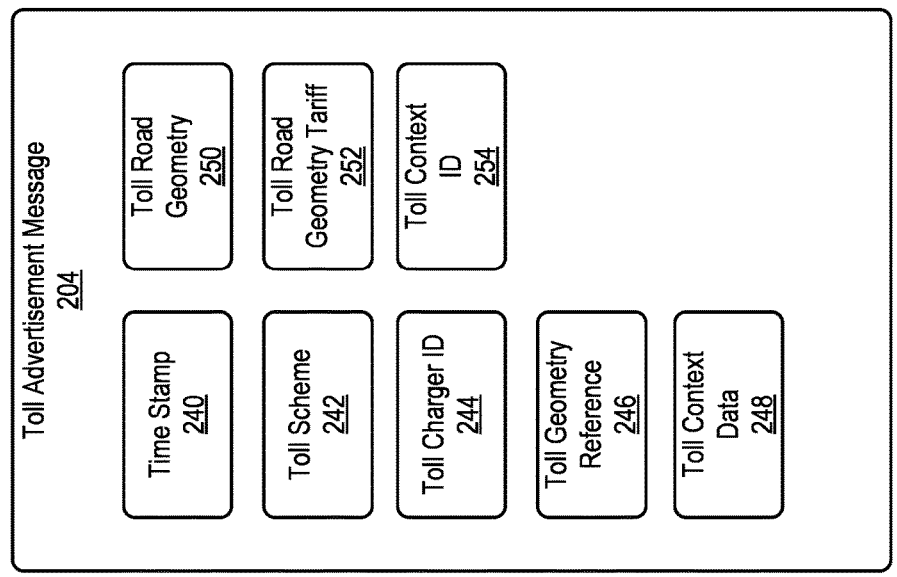
FIG. 3 illustrates an example of information included in the toll advertisement message.

FIG. 3 illustrates an example of information included in the TAM 204. Generally, the TAM 204 may include various information that may be useful for vehicles 102 in understanding usage of the roadway 110. This may include fields such as a timestamp 240 indicative of the time at which the TAM 204 was created or sent. The TAM 204 may also include a toll scheme 242 identifier indicative of what type of tolling approach is being used. Examples of various toll tariff approaches which may be specified by the toll scheme 242 are discussed below.

The TAM 204 may additionally include a toll charger identifier (ID) 244 specifying which toll charger server 116 is to be used to perform the tolling operation. The TAM 204 may also include a toll geometry reference 246, which may indicate a reference point from which locations of the tolling area may be computed (e.g., shown in FIG. 4 as reference point 304), as well as locations of toll trigger lines 306 at which the vehicle 102 may be configured to send the TUM 216 to pay the toll. The TAM 204 may also include toll context data 248, such as times of day, carpool lanes, or other restrictions or context on the use of the roadway 110.

Figure 5:
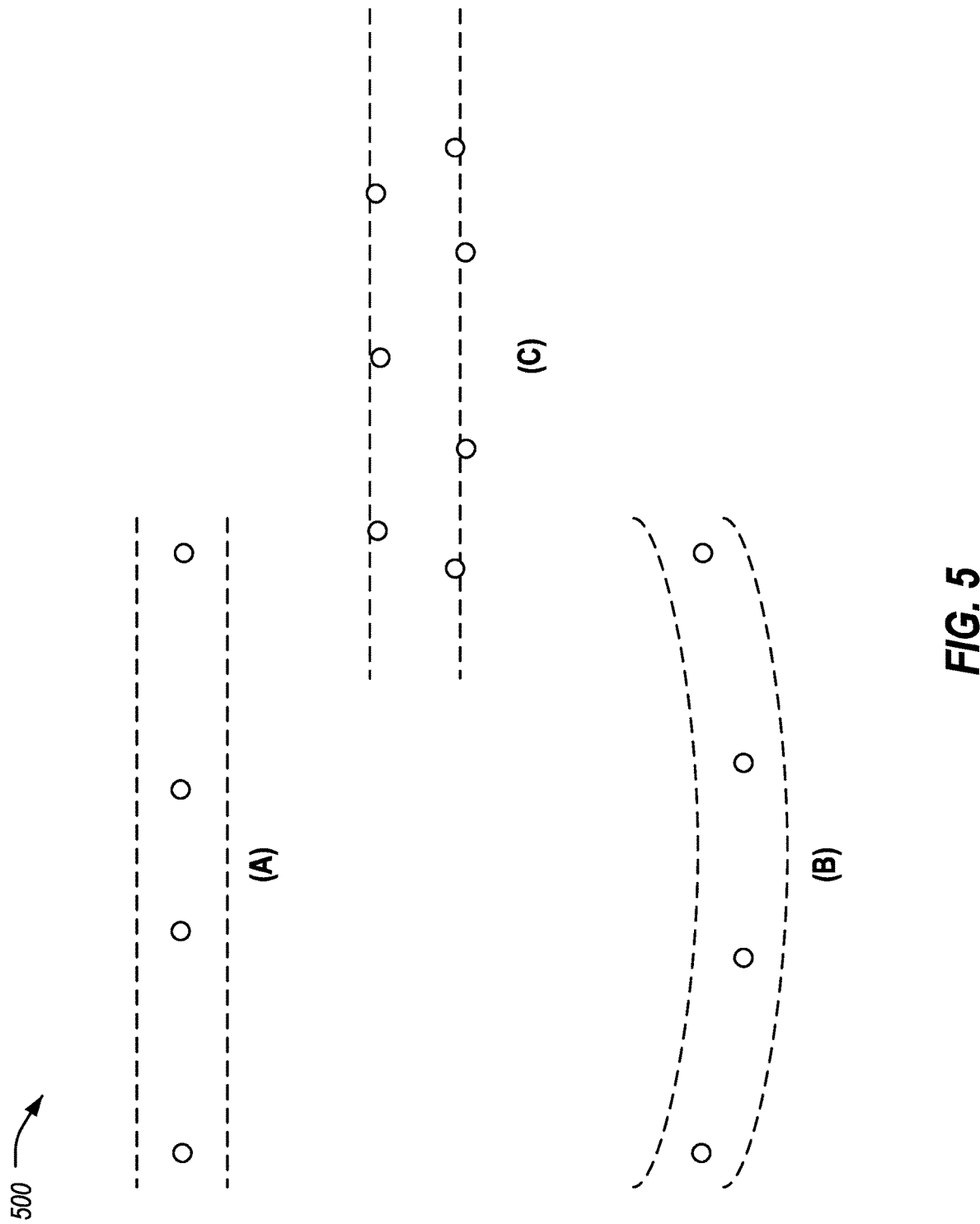
FIG. 5 illustrates an example of different road topologies.

The TAM 204 may also include toll road geometry 250 information with respect to the placement of lanes in a toll area. This may be useful in the generation of lane node offsets, as discussed in detail below. FIG. 5 also illustrates some examples of toll road geometry. The TAM 204 may also include toll road tariff 252 information, which relate to the costs to be applied for use of the roadway 110. These costs may be incurred by road segment, by lane, by time, by distance, or by passing through an area, as some examples.

A plurality of toll road tariff 252 data elements may be included in the TAM 204 for a set of tolling factors. These tolling factors may include one of (or a combination of) vehicle class (e.g., first responder vehicles, sedans, trucks, etc.), time class (e.g., weekends, rush hour, etc.), entry-exit combination (e.g., closed network tolling such as entering I-294 at Hindsdale and exiting at O'Hare), distance class (short run, long run, single exit, passing multiple exits, etc.) or other toll settings. This may allow for the discrete representation by the TAM 204 of complex tolling data.

The TAM 204 may further include a toll context identifier 254. The toll context identifier 254 may be a unique value. In one implementation, the toll context identifier 254 may be an integer of N bytes (e.g., N=4 leads to 2^32 combinations, N=8 leads to 2^64 combination, etc.).

As an illustrative example, the sequence of toll road tariffs 252 define the toll rate for each of a set of combinations, where each combination is denoted by a unique toll context identifier 254 value. For instance, as shown in Example (1):
Identifier=100 (4 pm-7 pm for Sedans) (1)
Identifier=101 (6 am-10 am for Sedans)
. . . (additional identifiers for other times) . . .
Identifier=40100 (Weekend for EVs)
. . . (additional identifiers for other vehicle types) . . .
Identifier=4020 (6 am-10 am for EVs)
In another example, the sequence of toll road tariff 252 data elements in the TAM 204 for a toll point define the toll rate for all exit toll points. As shown in Example (2):
Identifier=1 (exit Toll Point A 2 miles away) (2)
Identifier=2 (exit Toll Point B 15 miles away)
. . . (additional identifiers for other exits) . . .
Identifier=27 (exit Toll Point Z 250 miles away)
Accordingly, an arbitrary tolling scheme that defines a unique rate for various combinations of vehicle type, time class, and entry-exit toll point may be represented by a unique toll context identifier 254 value. If there are X number of combinations in either of two examples, a TAM 204 may carry a sequence of X toll road tariff 252 objects to define the toll rates for each combination.

The TAM 204 may also include other information such as a layer type, a layer identifier, an identifier of the toll charger server 116, and an identifier of the toll charger cloud 118. The layer type may be a data element used to uniquely identify a type of information to be found in a layer of a geographic map fragment such as an intersection. The layer identifier may correspondingly be an identifier of map information. The identifier may be a globally-unique identifiers (GUID), to allow the toll pay centers 118 to be uniquely identified by the system 100.

The TAM 204 may also include map information indicative of the layout of the roadway 110, such as an intersection geometry list and a road segment list. The road segment list include various properties of the roadway, including lane description, high occupancy status, and so on. This information may include, for instance, indications of the layout of the lanes of the roadway 110, which may be used to allow vehicles 102 to identify when a tolled area is approached, as well as in which lane the vehicle 102 is traveling. The TAM 204 may also indicate whether a toll gantry 112 is of a type that may require an enforced stop for the vehicle 102 (e.g., a stop and go), or to proceed under the speed limit (e.g., slowly). This may allow for the vehicle 102 to slow down, alert the vehicle 102 driver or occupants of the stop, or otherwise take actions in anticipation of the stop. Further aspects of map data and other details of message elements described herein are further defined in the J2735 standard Dedicated Short Range Communications (DSRC) Message Set Dictionary, published by the Society of Automotive Engineers (SAE) International, the standard being incorporated herein by reference in its entirety.

The TAM 204 may also include map information indicative of the locations of rest stop areas and/or service areas. This information may allow vehicles 102 to identify such locations. For instance, the locations of the rest stop areas and/or service areas may be displayed in the HMI 114 of the vehicle 102. It should be noted, however, that depending on the tolling scheme, charges may continue to be incurred by the vehicle 102 even if the vehicle 102 exits to a rest stop and/or service area. For instance, if the tolling scheme charges the vehicle 102 per time spent in the tolled area, then those charges may continue to be incurred despite the stop. It should be noted; however, that the vehicle 102 will still send a TUM 216 to indicate the vehicle 102 usage even if the vehicle 102 is powered off and back on again at a rest stop or service stop.

The TAM 204 may also include other information such as a list of data parameters. This may include, for instance, other information that may be relevant for tolling that does not fit into the other categories of information, such as special instructions for use of the toll roadway 110. The TAM 204 may also include a restrictions list, which may include information regarding limits to access to the roadway 110, such as weight limits, or restrictions against certain classes of vehicles 102 (e.g., no semitrucks allowed).

The TCU 104 of the vehicle 102 may receive the TAM broadcast by the RSU 108. The vehicle 102 may logs entry into the roadway 110. For instance, responsive to the geographic coordinates of the vehicle 102 matching one of the lanes of the roadway 110, the TCU 104 may identify that the vehicle 102 is entering a specific lane of the roadway 110. Knowing the lane of entry, the TCU 104 may then calculate the charge to be incurred by the vehicle 102. The TCU 104 may also generate a toll usage message (TUM) 216.

The TUM 216 includes various information provided by vehicles 102 to RSUs 108 that indicates usage of the roadway 110 by the vehicle 102. This information may include fields such as a message count that indicates a unique number of the TUM 216 for the transaction. The message count may be used to help in identifying if any packet loss has occurred. The TUM 216 may also include a unique random identifier that may be used as a temporary account identifier to track the transaction of messaging between the vehicle 102 and the broadcast message interface of the RSU 108, while preserving relative anonymity of the vehicle 102.

The TUM 216 may also include information about the vehicle 102 entry to the toll area. For instance, the TUM 216 may include a timestamp the time when the TUM 216 was created, latitude, longitude, and elevation of the vehicle 102, positional accuracy of the latitude, longitude, and elevation, speed of the vehicle 102, and heading of the vehicle 102. The TUM 216 may also include other information, such as type of the vehicle 102, an identifier of the toll charger server 116, and an identifier of the toll charger cloud 118. The identifiers may be GUIDs, to allow the toll charger servers 116 and toll pay centers 118 to be uniquely identified. The TUM 216 may also include an intersection identifier of the intersection through which the vehicle 102 entered the roadway 110, where the intersection identifier was received by the vehicle 102 in the TAM 204 (e.g., via the intersection geometry list and/or road segment list). The TUM 216 may also include a charge amount for the travel in the tolled area as determined by the vehicle 102 using the information in the TAM 204. Other information may also be included in the TUM 216, such as the distance traveled 830 by the vehicle 102, a number of passengers in the vehicle 102, and a license plate number or other identifier of the vehicle 102.

The TCU 104 may update the HMI 114 to cause the HMI 114 to display a message indicating that the vehicle 102 entered the toll zone. The HMI 114 may further indicate that the vehicle 102 will be charged the amount indicated for the lane that the vehicle 102 is in.

The TCU 104 may send the TUM 216 to the RSU 108. In one example, the TUM may be encoded with a key and/or signed using a certificate, and the RSU 108 may utilize a key or other information to decrypt and/or confirm the sender of the TUM 216 as being the TCU 104. The RSU 108 may forward the TUM 216 to the toll charger server 116. The toll charger server 116 may forwards the TUM 216 to the toll charger cloud 118 corresponding to the vehicle 102. The toll charger cloud 118 may verify the vehicle 102 account with the customer account system 122 and complete the transaction. The toll charger cloud 118 may accordingly generates a toll receipt message (TRM) 212 to be returned to the vehicle 102.

In some examples, the vehicle 102 broadcasting the TUM 216 may create a blockchain record of the TUM 216 enforced as a smart contract. The RSU 108 may operate as a transaction database from the TUM 216 information broadcast by the vehicle 102 through exchange of the smart contract. A transaction database at the RSU 108 may update a distributed block chain ledger of received TUMs 216 for tolling enforcement at the RSU 108 and toll gantry 112.

The TRM 212 may include various information determined by the toll charger cloud 118 in support of completion of the toll transaction performed with the vehicle 102. This information may include a message count (to help in identifying if any packet loss has occurred), the account identifier from the TUM 216, the timestamp the time when the TUM 216 was created, an identifier of the toll charger server 116, and an identifier of the toll charger cloud 118 (e.g., a GUID). The TRM 212 may also include an intersection identifier of the intersection through which the vehicle 102 entered the roadway 110 (e.g., as indicated in the TUM 216 that was processed by the toll charger cloud 118), a lane identifier of which lane through which the vehicle 102 entered the roadway 110 (e.g., as indicated in the TUM 216 that was processed by the toll charger cloud 118), an intersection identifier of the intersection through which the vehicle 102 exited the roadway 110, and a lane identifier of which lane through which the vehicle 102 exited the roadway 110. The TRM 212 may also include the vehicle type and the amount charged for access to the roadway 110.

The toll charger cloud 118 may forward the TRM 212 to the toll charger server 116. In turn, the toll charger server 116 may forward the TRM 212 back to the RSU 108. The RSU 108 may broadcast the TRM 212, which may be received by the TCU 104 of the vehicle 102. The TCU 104 may update the HMI 114 to display a message indicating completion of the process and the final charged amount.

The smart toll application 202 may receive various elements of data as input. In an example, these inputs may include TAMs 204 (as mentioned above), location information from the GNSS 115 controller, vehicle bus data 206 from a vehicle controller area network (CAN) or other vehicle 102 bus, vehicle assistance 208 information, in-built maps 210 to aid in location of the vehicle 102 along the roadway 110, and TRMs 212 (also as mentioned above).

The smart toll application 202 may provide various outputs as well. In an example, these outputs may include HMI feedback 214 provided to the HMI 114 for use by occupants of the vehicle 102, as well as TUMs 216 for use in charging the vehicle 102 via remote aspects of the tolling system 100 discussed above.

To perform the processing of the inputs into the outputs, the smart toll application 202 may include various components. These may include a tolling data aggregator 218 to process the TAMs 204 and TRMs 212, an algorithm classifier 220, a toll region determiner 222 to determine tolling ranges along the roadway 110, a toll lane matcher 224 to match the vehicle 102 to the tolling ranges, a lane straddle algorithm 226 to determine whether the vehicle 102 is straddling across lanes, a position confidence 228 component to handle GNSS offsets sand other confidence factors, a position estimator 230 to estimate the vehicle 102 position, a path estimator 232 to estimate the vehicle 102 path using the vehicle 102 position, an algorithm overlay 234 to aid in providing the HMI feedback 214, and an algorithm decision 236 component to provide the TUMs 216 and other outputs.

Figure 4:
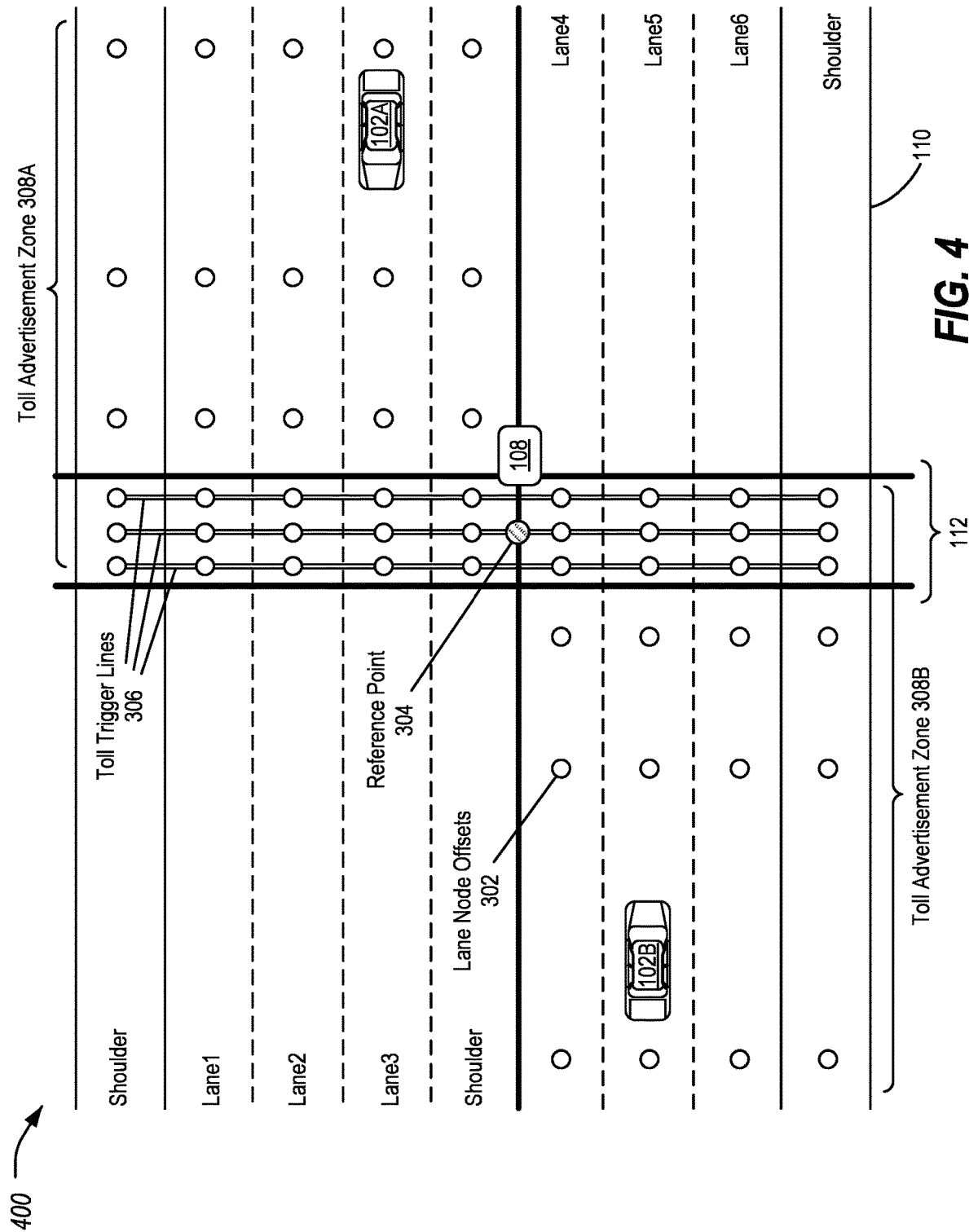
FIG. 4 illustrates an example of a toll road geometry.

FIG. 4 illustrates an example 400 of a toll road geometry. As shown, a toll gantry 112 extends across lanes of a roadway 110. The lanes of the roadway 110 include, for example, in a first travel direction, a shoulder, a first lane, a second lane, a third lane, and a shoulder. The illustrated roadway 110 further includes a center median, and lanes in a second travel direction, namely, a fourth lane, a fifth lane, a sixth lane, and a shoulder. It should be noted that the particular roadway layout is merely an example. An RSU 108 is in operation in control of the toll gantry 112.

Lane node offsets 302 are also illustrated in the roadway 110. These lane node offsets 302 indicate geographic locations along the roadway with respect to a reference point 304 indicating the geographic location of the toll gantry 112. Which lane node offsets 302 to use may depend on the direction of travel of the vehicle 102. For example, the vehicle 102A is traveling in the first travel direction, and therefore may reference its location with respect to the lane node offsets 302 for the lanes in that travel direction (e.g., lanes one through three). These lane node offsets 302 may make up the toll advertisement zone 308A for the first travel direction. The final lane node offsets 302 for each lane may collectively define toll trigger lines 306 at which the vehicle 102 may be configured to pay the toll. As the vehicle 102B is traveling in the second travel direction, it therefore may reference its location with respect to the lane node offsets 302 for the lanes in that second travel direction (e.g., lanes four through six). These lane node offsets 302 may make up the toll advertisement zone 308B for the second travel direction.

FIG. 5 illustrates an example 500 of different road topologies. A straight road topology is shown at (A), a curved road topology is shown at (B), and a polygon road topology is shown at (C). The straight and curved road topologies may be represented as a series of lane node offsets 302 alone the travel path. The polygon road topology may be represented as a set of lane node offsets 302 bounding the travel path.

Regardless of how the road topology is represented, the information for the offsets may be broadcast by the RSU 108 in the TAM 204.

In addition, different toll tariff approaches may be defined. A section toll tariff approach with road segment pricing may be defined, in which each road segment has a tariff for its traversal. A section toll tariff approach with closed network pricing may be defined, in which each road exit from an entrance has a tariff for exiting at that location. A cordon charging toll tariff approach may be defined, in which entrance and exit of the cordon incurs a cost. An area charging toll tariff approach may be defined, in a first subtype where cost is incurred according to time spent in the area, and in a second subtype where cost is incurred according to distance traveled within the area. The toll tariff approach and tariff amounts may be specified in the fields of the TAM 204.

Figure 6:
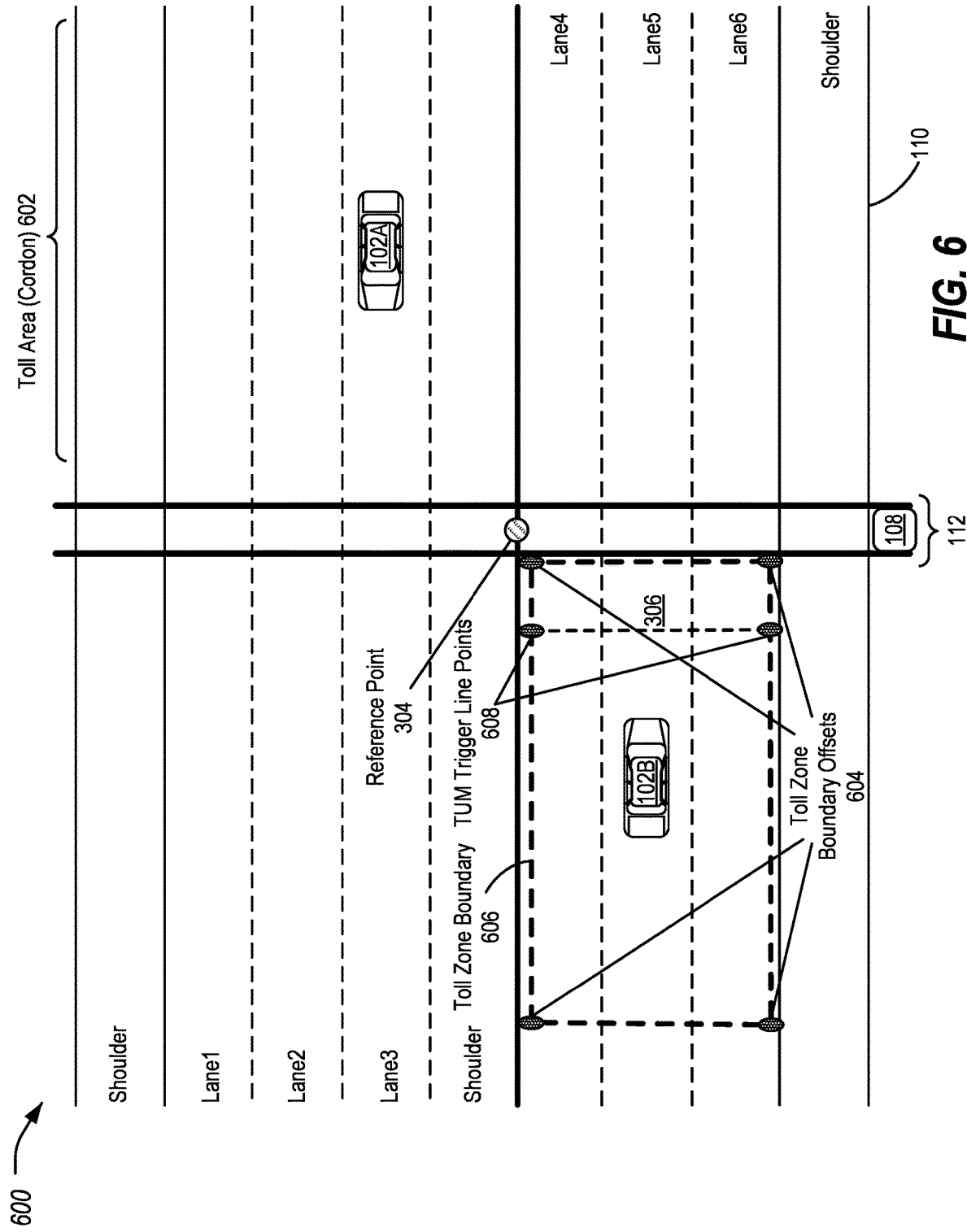
FIG. 6 illustrates an example of the roadway utilizing the cordon charging toll tariff approach.

FIG. 6 illustrates an example 600 of the roadway 110 utilizing the cordon charging toll tariff approach. As shown, the vehicle 102A is exiting a toll area 602, while the vehicle 102B is approaching the toll area 602. The vehicle 102 may calculate toll-zone boundary offsets 604 of the toll lanes along with the TAM lane node offsets 302 and the TAM reference point 304. This may be done in view of the vehicle 102 heading, to address points in lanes having the same travel direction as the vehicle 102 and to filter out lanes in directions other than the direction of vehicle 102 travel (e.g., the opposite direction lanes of a highway). For instance, this determination of vehicle 102 direction may account for factors such as side slip angle. By determining the toll-zone boundary offsets 604 of the cordon toll area 602 based on data in the TAM 204, a toll-zone boundary 606 is created. Additionally, by determination of TUM trigger line points 608 based on the data in the TAM 204, the toll trigger lines 306 are determined. These determinations may be performed in view of the various types of road geometries as shown in FIG. 5 and based on the various types of toll tariff approaches as discussed above. The vehicle 102 may utilizes the vehicle 102 the toll-zone boundary 606 to compute whether the vehicle 102 is within which of the cordon area.

Figure 7:
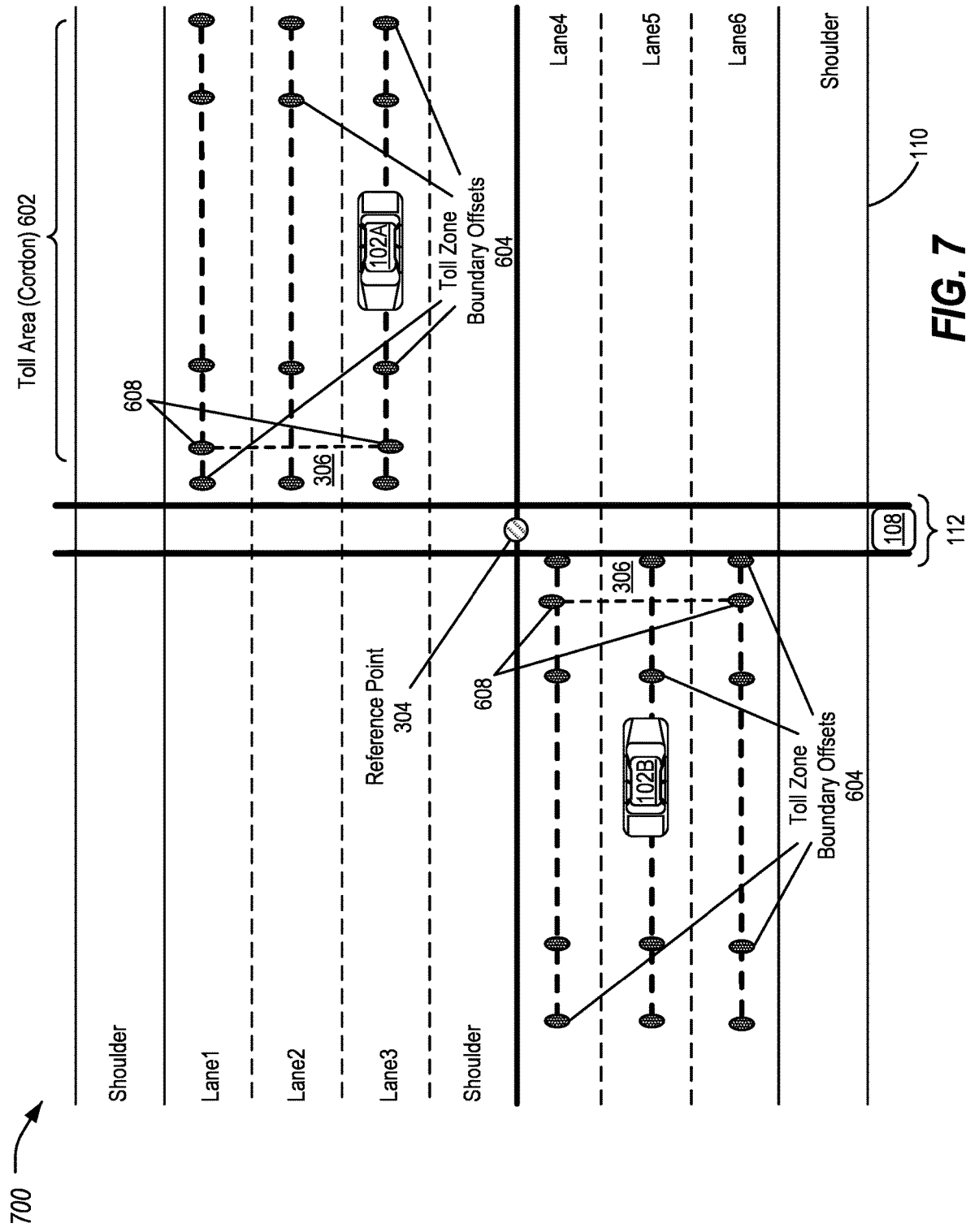
FIG. 7 illustrates an example of the roadway utilizing the cordon charging toll tariff approach with variable rates for different lanes.

FIG. 7 illustrates an example 700 of the roadway 110 utilizing the cordon charging toll tariff approach with variable rates for different lanes. As compared to the example 600, in the example 700, the toll-zone boundary offsets 604 are determined for each lane based on data in the TAM 204. Additionally, each travel direction also includes TUM trigger line points 608 based on the data in the TAM 204. This allows for the vehicle 102 to compute which lane the vehicle 102 is in, not just whether the vehicle 102 is in the cordon area generally.

Figure 8:
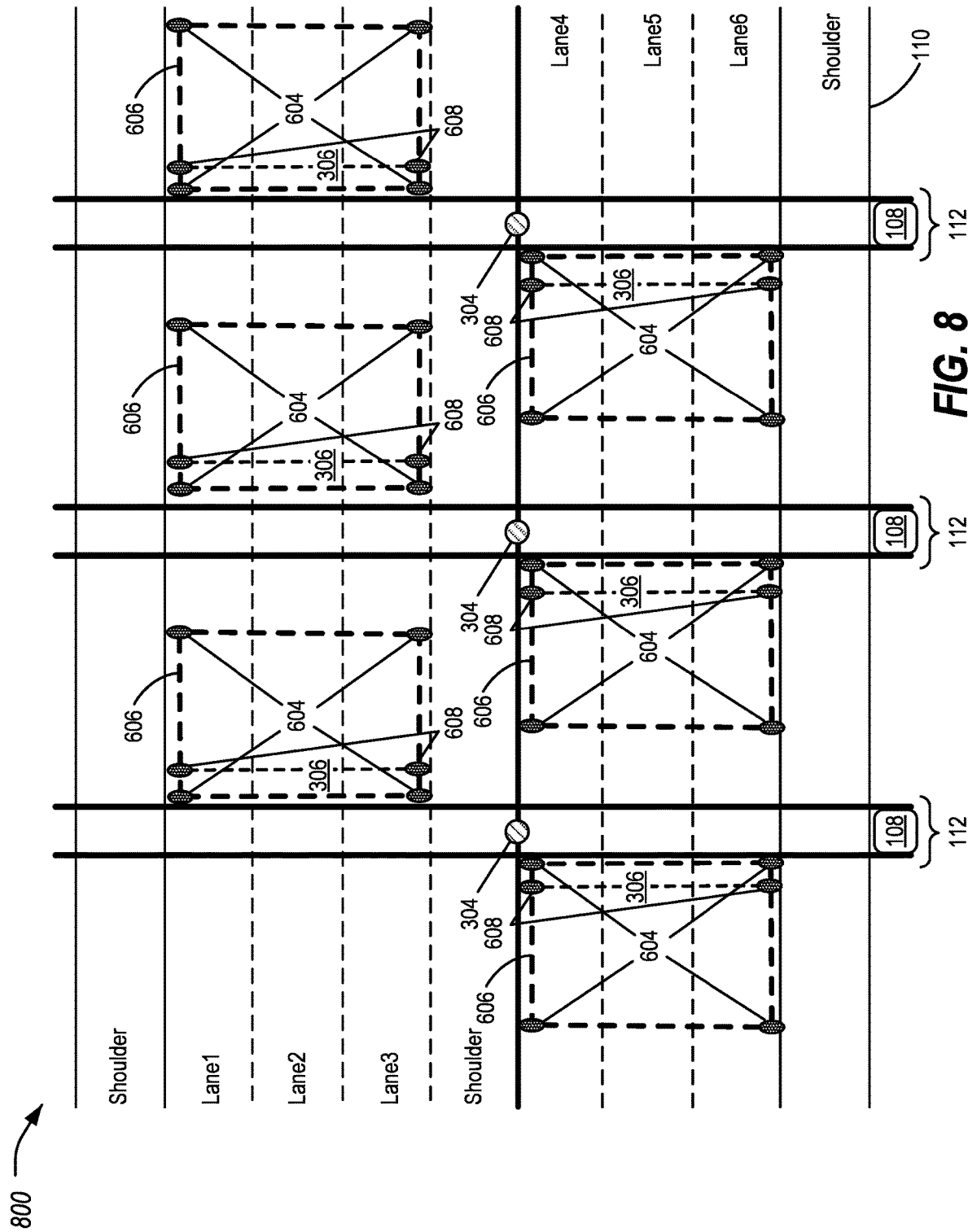
FIG. 8 illustrates an example of the roadway utilizing the section toll tariff approach with road segment pricing.

FIG. 8 illustrates an example 800 of the roadway 110 utilizing the section toll tariff approach with road segment pricing. Similar to the example 600, in the example 800, toll-zone boundary offsets 604 are calculated by the vehicle 102 to determine toll-zone boundaries 606. However, consistent with the section toll tariff approach with road segment pricing, different sections are specified in the TAM 204 for each of the segments. Accordingly, a toll-zone boundary 606 for each segment is computed by the vehicle 102. Each segment also includes TUM trigger line points 608 based on the data in the TAM 204.

Figure 9:
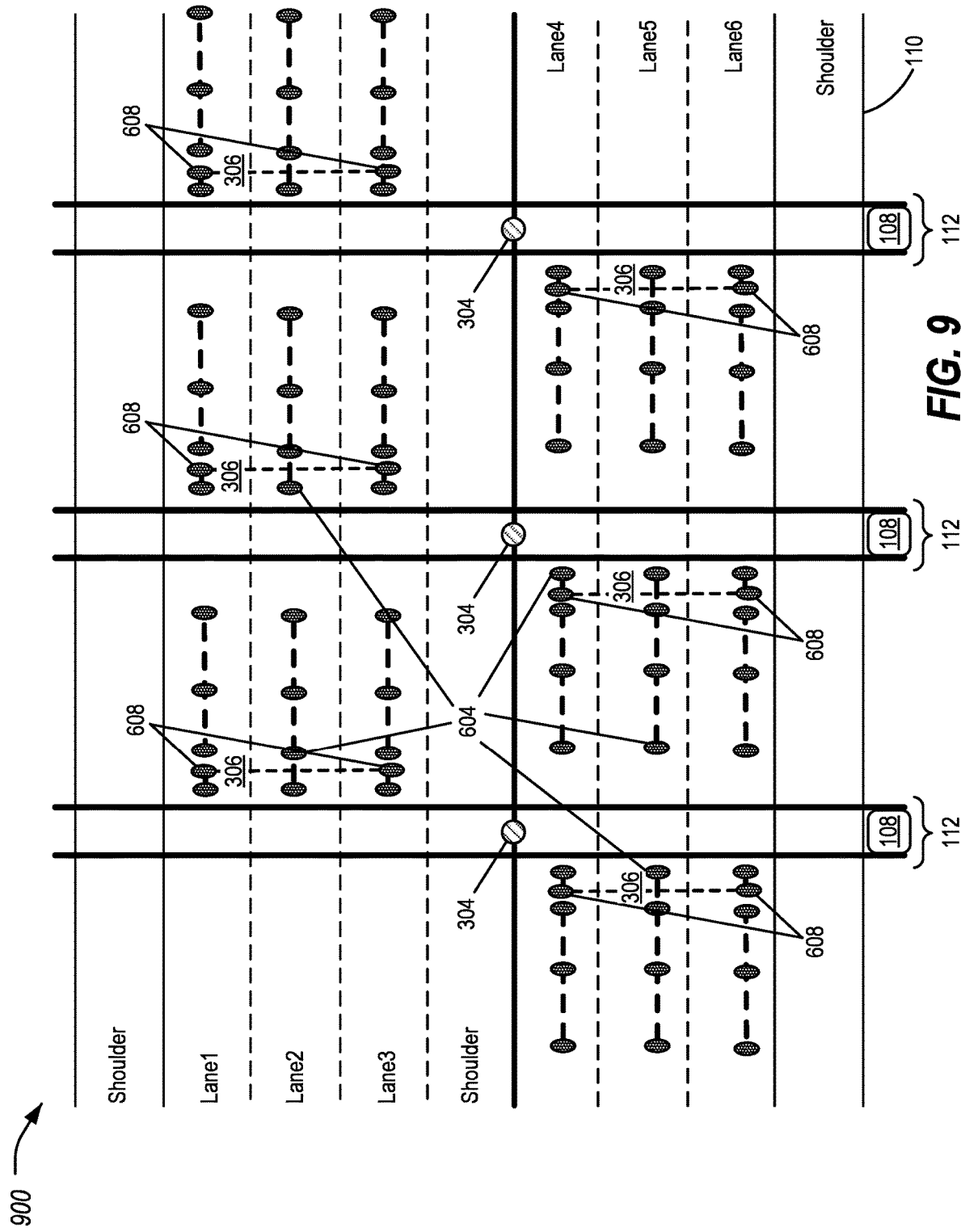
FIG. 9 illustrates an example of the roadway utilizing the section toll tariff approach with road segment pricing with variable rates for different lanes.

FIG. 9 illustrates an example 900 of the roadway 110 utilizing the section toll tariff approach with road segment pricing with variable rates for different lanes. Similar to the example 700, the virtual toll-zone boundary offsets 604 are determined for each lane based on data in the TAM 204. Each segment also includes TUM trigger line points 608 based on the data in the TAM 204. Similar to the example 800, this is done by the vehicle for each section of the roadway 110 specified in the TAM 204. This allows for the vehicle 102 to compute which lane the vehicle 102 is in for each segment.

Figure 10:
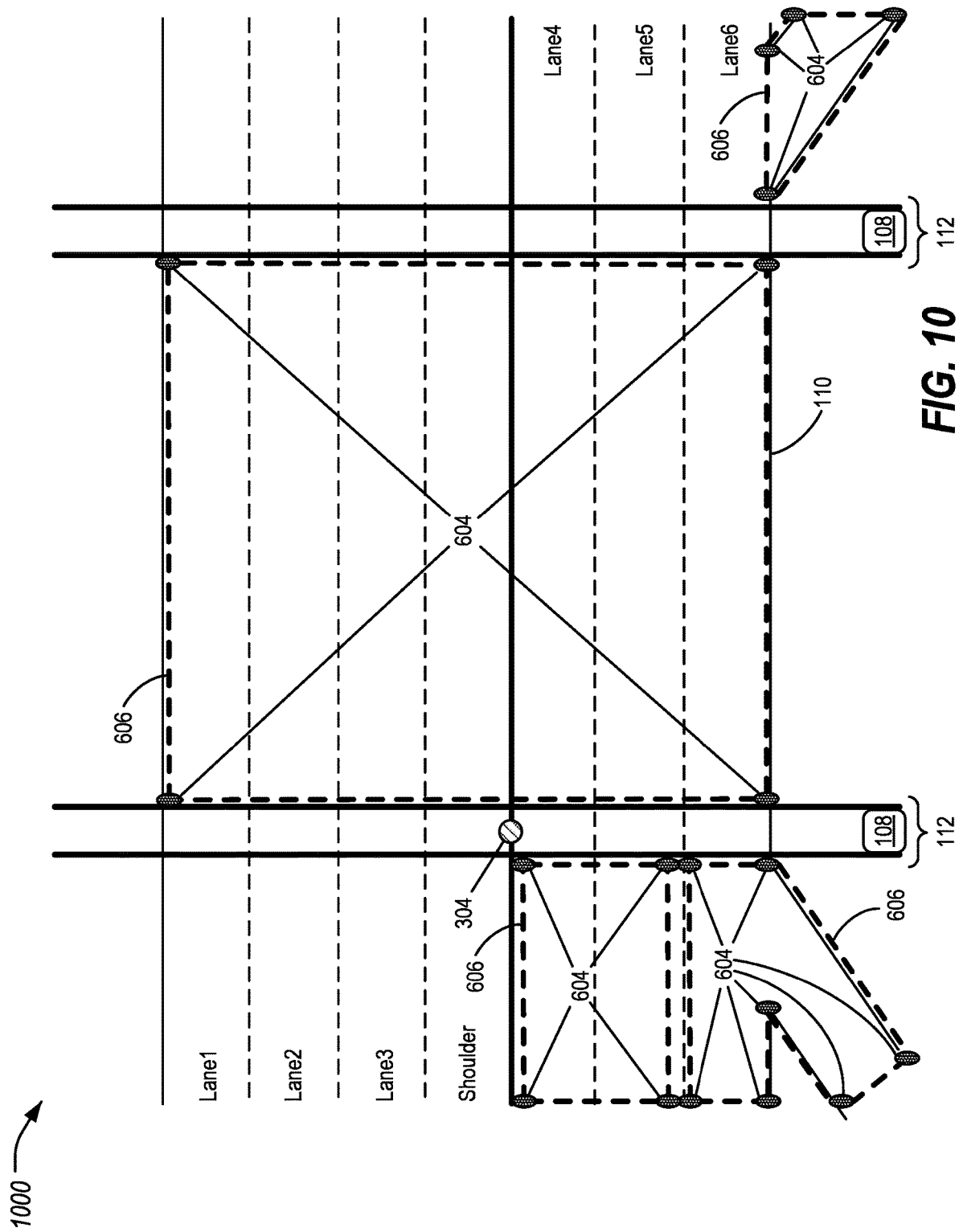
FIG. 10 illustrates an example of the roadway utilizing toll-zone boundaries of different shapes.

FIG. 10 illustrates an example 1000 of the roadway 110 utilizing toll-zone boundaries 606 of different shapes. These different shapes may be defined by the information in the TAM 204. As shown, the shapes may cover a single direction of travel or multiple directions of travel. The shapes may also include other traffic features such as entrance ramps, merge lanes, and/or exit ramps.

Figure 11:
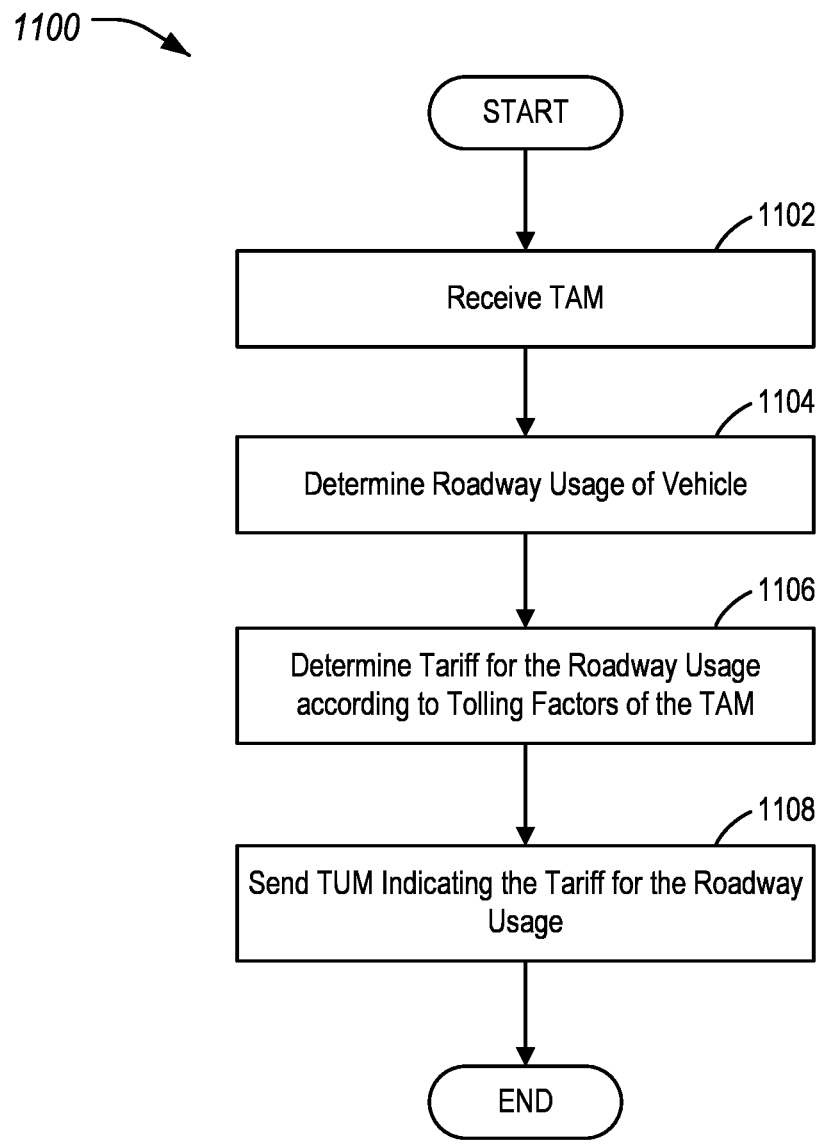
FIG. 11 illustrates an example process for performance of V2X tolling transactions in accordance with the information in the toll advertisement message.

FIG. 11 illustrates an example process 1100 for the performance of V2X tolling transactions in accordance with the information in the TAM 204. In an example, the process 1100 may be performed by the vehicle 102 in V2X communication with the RSU 108.

At operation 1102, the vehicle 102 receive the TAM 204. The TAM 204 may have been broadcast from a road-side unit (RSU) via V2X communication and may define a plurality of toll road tariff data elements. Each of the toll road tariff data elements may specify a set of tolling factors indexed by a unique toll context identifier.

At operation 1104, the vehicle 102 determines roadway usage of the vehicle 102. For instance, the vehicle 102 may identify information such as the class of the vehicle 102, the time of day, the entrance to the roadway 110 used by the vehicle 102, the exit from the roadway 110 used by the vehicle 102, time spent in a cordon area by the vehicle 102, and/or distance traveled in the cordon area by the vehicle 102.

At operation 1106, the vehicle 102 determines a tariff for the roadway usage according to the set of tolling factors of the TAM 204. For instance, the vehicle 102 may compare the information to the toll road tariff data elements to identify one of the toll road tariff data elements that best applies to the information of the vehicle 102. Sets of toll road tariff data elements are discussed above as Example (1) and Example (2).

The vehicle 102 may further, based on the tariff information for the identified one of the toll road tariff data elements, determine the tariff for the roadway usage using the one of the toll road tariff data elements and the information. For instance, if the toll road tariff data elements specifies a tariff for one or more of vehicle class, time class, entry-exit combination, and/or toll tariff approach type, then that tariff may be applied to the vehicle 102 if the vehicle 102 meets the specified requirements.

As another example, if the toll road tariff data elements specify a section toll tariff approach with tariffs for traversal per road segment, the tariff may be computed based on vehicle 102 traversal of the indicated segments. As yet another example, if the toll road tariff data elements specify a closed network approach type in which each of a plurality of road exit from an entrance has an indicated tariff for exiting at that respective road exit, the tariff may be computed based on vehicle 102 traversal of the indicated entrance and exits.

As another example, if the toll road tariff data elements specify a cordon charging toll tariff approach in which entrance and exit of a cordon area has an indicated cost, the tariff may be computed based on vehicle 102 entrance and exit to the cordon area, regardless of time spent or distance traveled in the cordon area. In a further example, if the toll road tariff data elements specify an area charging toll tariff approach in which cost is incurred according to distance traveled in a cordon area, the tariff may be computed based on vehicle 102 distance traveled within the cordon area.

At operation 1108, the vehicle 102 sends the TUM 216 via the V2X communication. The TUM 216 may indicate, to the RSU 108, the tariff for the roadway usage of the vehicle 102. Accordingly, the TAMs 204 may be used to representation complex toll road geometries and topologies, as well as complex toll lane topologies. These geometries and topologies may accordingly be conveyed via the TAMS 204 utilizing the V2X communications for the vehicles 102. In addition, the TAMs 204 may also include TUM trigger line points 608 defining toll trigger lines 306 for TUMs 216 to be broadcast by the vehicles 102 crossing the toll trigger lines 306, as well as toll enforcement trigger points. This approach may be used to represent and denote various tolling schemes based on the specific unique combinations of vehicle type, time class, and/or entry-exit toll point pair.

Figure 12:
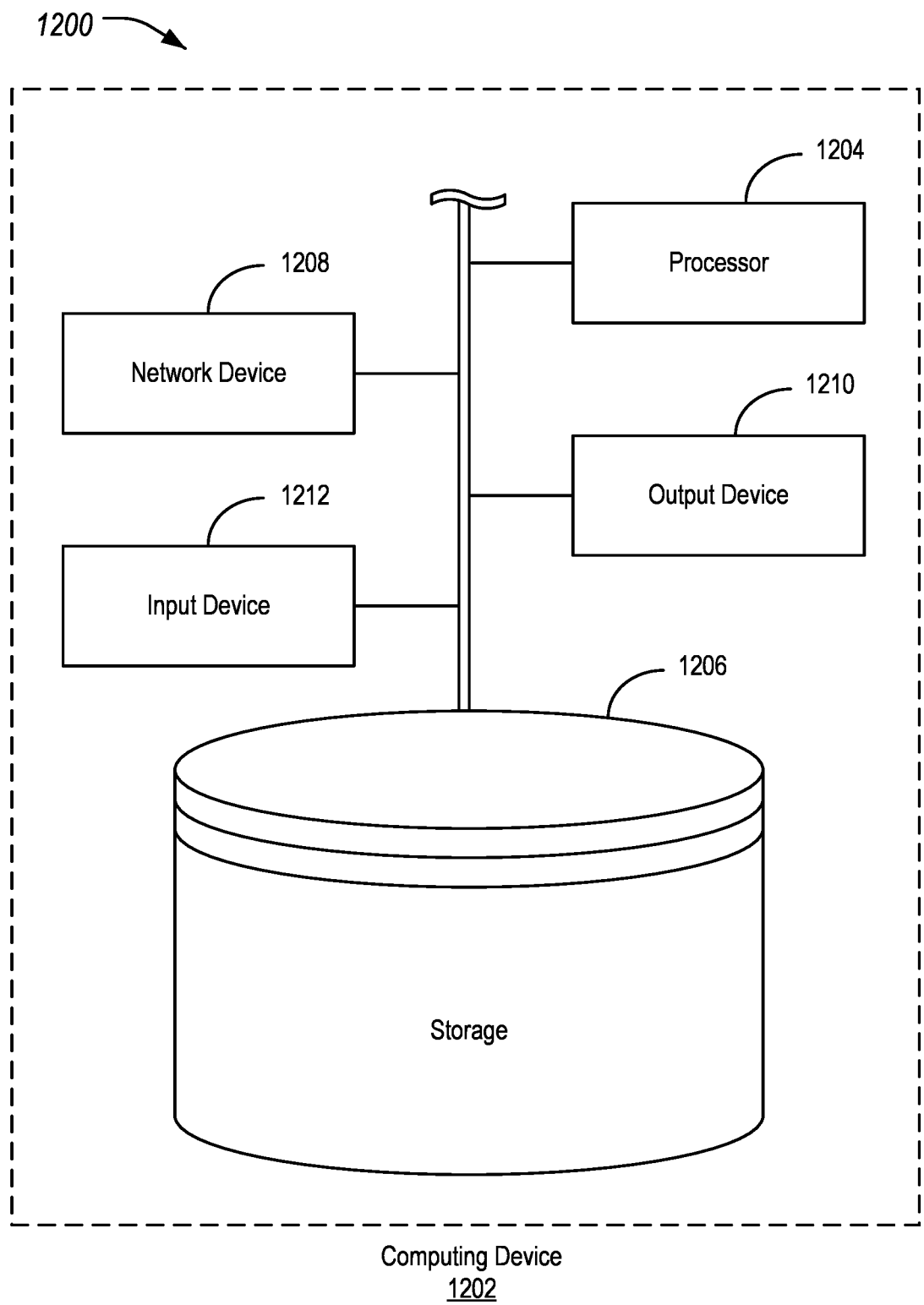
FIG. 12 illustrates an example of a computing device for use in the performance of V2X tolling transactions.

FIG. 12 illustrates an example 1200 of a computing device 1202 for use in the performance of V2X tolling transactions. Referring to FIG. 12, and with reference to FIGS. 1-11, the TCU 104, RSU 108, toll charger server 116, toll charger cloud 118, and customer account system 122 may be examples of such computing devices 1202. As shown, the computing device 1202 may include a processor 1204 that is operatively connected to a storage 1206, a network device 1208, an output device 1210, and an input device 1212. It should be noted that this is merely an example, and computing devices 1202 with more, fewer, or different components may be used.

The processor 1204 may include one or more integrated circuits that implement the functionality of a central processing unit (CPU) and/or graphics processing unit (GPU). In some examples, the processors 1204 are a system on a chip (SoC) that integrates the functionality of the CPU and GPU. The SoC may optionally include other components such as, for example, the storage 1206 and the network device 1208 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1204 executes stored program instructions that are retrieved from the storage 1206. The stored program instructions, accordingly, include software that controls the operation of the processors 1204 to perform the operations described herein. The storage 1206 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1210. The output device 1210 may include a graphical or visual display device, such as an electronic display screen, projector, printer, or any other suitable device that reproduces a graphical display. As another example, the output device 1210 may include an audio device, such as a loudspeaker or headphone. As yet a further example, the output device 1210 may include a tactile device, such as a mechanically raiseable device that may, in an example, be configured to display braille or another physical output that may be touched to provide information to a user.

The input device 1212 may include any of various devices that enable the computing device 1202 to receive control input from users. Examples of suitable input devices that receive human interface inputs may include keyboards, mice, trackballs, touchscreens, voice input devices, graphics tablets, and the like.

The network devices 1208 may each include any of various devices that enable the TCU 104, RSU 108, toll charger server 116, toll charger cloud 118, toll service provider 120, and customer account system 122 to send and/or receive data from external devices over networks (such as the communications network 106). Examples of suitable network devices 1208 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for smart tolling, comprising:
   receiving, by a vehicle, a toll advertisement message (TAM), broadcast from a road-side unit (RSU) via V2X communication, the TAM defining a plurality of toll road tariff data elements, each of the toll road tariff data elements specifying a set of tolling factors indexed by a unique toll context identifier,
   determining roadway usage of the vehicle,
   determining a tariff for the roadway usage according to the set of tolling factors of the TAM, and
   sending a toll usage message (TUM) via the V2X communication, the TUM indicating, to the RSU, the tariff for the roadway usage of the vehicle.

2. The method of claim 1, wherein each of the toll road tariff data elements specifies a tariff for one or more of vehicle class, time class, distance class, entry-exit combination, and/or toll tariff approach type.

3. The method of claim 2, wherein the toll tariff approach type includes a section toll tariff approach with tariffs for traversal per road segment.

4. The method of claim 2, wherein the toll tariff approach type includes a closed network approach type in which each of a plurality of road exit from an entrance has an indicated tariff for exiting at that respective road exit.

5. The method of claim 2, wherein the toll tariff approach type includes a cordon charging toll tariff approach in which entrance and exit of a cordon area has an indicated cost.

6. The method of claim 2, wherein the toll tariff approach type includes an area charging toll tariff approach in which cost is incurred according to time spent in a cordon area.

7. The method of claim 2, wherein the toll tariff approach type includes an area charging toll tariff approach in which cost is incurred according to distance traveled in a cordon area.

8. The method of claim 1, wherein each of the toll road tariff data elements specifies a tariff for a combination of two or more of vehicle class, time class, distance class, entry-exit combination, and/or toll tariff approach type.

9. The method of claim 1, further comprising:
   identifying information, the information including class of the vehicle, time of day, entrance used by the vehicle, exit used by the vehicle, time spent in a cordon area, and distance traveled in the cordon area;
   comparing the information to the toll road tariff data elements to identify one of the toll road tariff data elements that applies to the vehicle; and
   determining the tariff for the roadway usage using the one of the toll road tariff data elements and the information.

10. A vehicle for smart tolling, comprising:
    a telematics control unit configured to provide vehicle-to-everything (V2X) communication; and
    a processor, programmed to
      receive a toll advertisement message (TAM), broadcast from a road-side unit (RSU) via the V2X communication, the TAM defining a plurality of toll road tariff data elements, each of the toll road tariff data elements specifying a set of tolling factors indexed by a unique toll context identifier,
      determine roadway usage of the vehicle with respect to roadway geometry,
      determine a tariff for the roadway usage according to the set of tolling factors of the TAM, and
      send a toll usage message (TUM) via the V2X communication, the TUM indicating, to the RSU, the tariff for the roadway usage of the vehicle.

11. The vehicle of claim 10, wherein each of the toll road tariff data elements specifies a tariff for one or more of vehicle class, time class, distance class, entry-exit combination, and/or toll tariff approach type.

12. The vehicle of claim 11, wherein the toll tariff approach type includes a section toll tariff approach with tariffs for traversal per road segment.

13. The vehicle of claim 11, wherein the toll tariff approach type includes a closed network approach type in which each of a plurality of road exit from an entrance has an indicated tariff for exiting at that respective road exit.

14. The vehicle of claim 11, wherein the toll tariff approach type includes a cordon charging toll tariff approach in which entrance and exit of a cordon area has an indicated cost.

15. The vehicle of claim 11, wherein the toll tariff approach type includes an area charging toll tariff approach in which cost is incurred according to time spent in a cordon area.

16. The vehicle of claim 11, wherein the toll tariff approach type includes an area charging toll tariff approach in which cost is incurred according to distance traveled in a cordon area.

17. The vehicle of claim 10, wherein each of the toll road tariff data elements specifies a tariff for a combination of two or more of vehicle class, time class, distance class, entry-exit combination, and/or toll tariff approach type.

18. The vehicle of claim 10, wherein the processor is further programmed to:
   identify information including class of the vehicle, time of day, entrance used by the vehicle, exit used by the vehicle, time spent in a cordon area, and distance traveled in the cordon area;
   compare the information to the toll road tariff data elements to identify one of the toll road tariff data elements that applies to the vehicle; and
   determine the tariff for the roadway usage using the one of the toll road tariff data elements and the information.

19. The vehicle of claim 10, wherein the TAM specifies locations of one or more rest stops and/or service stops along the roadway geometry, and the processor is further programmed to:
   maintain information with respect to traversal of at least a portion of the roadway geometry during power off at a rest stop or service stop; and
   send the toll usage message (TUM) after powering the vehicle back on and the vehicle is in vicinity of the RSU.

20. The vehicle of claim 19, wherein the TAM specifies whether an upcoming toll gantry is of a type requiring the vehicle to stop and go or proceed to drive under a speed limit, and the processor is further programmed to indicate an alert, in the vehicle user interface, responsive to the upcoming toll gantry requiring the vehicle to stop and go or proceed to drive under the speed limit.

* * * * *